United States Patent
Chou et al.

(10) Patent No.: US 6,534,592 B1
(45) Date of Patent: Mar. 18, 2003

(54) CAPSTOCK COMPOSITION AND PROCESS PROVIDING WEATHERABILITY, REDUCED GLOSS, AND HIGH IMPACT

(75) Inventors: Chuen-Shyong Chou, Ambler, PA (US); Katerina Dukes Neglia, Philadelphia, PA (US); Eugene Carl Szamborski, Richboro, PA (US)

(73) Assignee: Rohm and Haas Company, Philadelphia, PA (US)

( * ) Notice: Subject to any disclaimer, the term of this patent is extended or adjusted under 35 U.S.C. 154(b) by 234 days.

(21) Appl. No.: 09/593,636

(22) Filed: Jun. 13, 2000

Related U.S. Application Data

(60) Provisional application No. 60/139,652, filed on Jun. 17, 1999.

(51) Int. Cl.⁷ .............................................. C08L 51/04
(52) U.S. Cl. .......................................... 525/70; 525/71
(58) Field of Search ...................... 525/71, 70

(56) References Cited

U.S. PATENT DOCUMENTS

| | | |
|---|---|---|
| 3,415,796 A | 12/1968 | Souder et al. |
| 3,473,996 A | 10/1969 | Whalen |
| 3,812,205 A | 5/1974 | Dunkelberger |
| 4,052,525 A | 10/1977 | Ide et al. |
| 4,100,325 A | 7/1978 | Summers et al. |
| 4,115,480 A | 9/1978 | Kinoshita et al. |
| 4,141,935 A | 2/1979 | Dunkelberger |
| 4,169,180 A | 9/1979 | McDonagh |
| 4,189,520 A | 2/1980 | Gauchel |
| 4,320,174 A | 3/1982 | Rabinovitch et al. |
| 4,452,941 A | 6/1984 | Kishida et al. |
| 4,576,870 A | 3/1986 | Liebler et al. |
| 4,897,462 A | 1/1990 | Yusa et al. |
| 4,999,402 A | 3/1991 | Yamamoto et al. |
| 5,028,476 A | 7/1991 | Dehennau et al. |
| 5,047,474 A | 9/1991 | Rabinovich et al. |
| 5,108,835 A | 4/1992 | Hahnsen et al. |
| 5,216,082 A | 6/1993 | Heil et al. |
| 5,306,456 A | 4/1994 | Suhadolnik et al. |
| 5,318,737 A | 6/1994 | Trabert et al. |
| 5,415,921 A | 5/1995 | Grohman |
| 5,543,463 A | 8/1996 | Kitaike et al. |
| 5,932,655 A | 8/1999 | Auclair et al. |
| 5,965,665 A | 10/1999 | Fukuyama et al. |
| 6,031,047 A | 2/2000 | Brady et al. |

FOREIGN PATENT DOCUMENTS

| | | |
|---|---|---|
| EP | 60042 B | 9/1982 |
| EP | 110123 A | 6/1984 |
| EP | 458520 A | 11/1991 |
| EP | 473379 A | 4/1992 |
| EP | 534211 A | 3/1993 |
| EP | 534244 A | 3/1993 |
| JP | 9-93122 | 4/1993 |
| JP | 9-174735 | 7/1997 |
| JP | 9-216268 | 8/1997 |
| JP | 9-216269 | 8/1997 |
| WO | WO96/37531 | 11/1996 |

OTHER PUBLICATIONS

Martino, R., "Vinyl Dresses Up for New Era in Siding", Modern Plastics, Jun., 1976, pp. 34–37.
European Patent Office Search Report for EP Patent Application 00304788.3–2109–dated Aug. 8, 2000.

Primary Examiner—Jeffrey Mullis

(57) ABSTRACT

Compositions are disclosed that are processable into capstocks having a reduced gloss appearance, high impact strength and superior weatherability. The capstocks described herein are especially useful for extrusion into articles. They are also useful for application to various poor weathering structural plastic articles for preparing multilayered composites having improved weatherability. Methods for manufacturing structural plastic capstocks and composites and articles produced therefrom having reduced gloss appearance are also described.

15 Claims, No Drawings

CAPSTOCK COMPOSITION AND PROCESS PROVIDING WEATHERABILITY, REDUCED GLOSS, AND HIGH IMPACT

CROSS REFERENCE TO RELATED PATENT APPLICATIONS

This is a non-provisional application of prior pending U.S provisional application Ser. No. 60/139,652 filed Jun. 17, 1999.

BACKGROUND

This invention relates to compositions which can be used as capstock as well as in other applications. These compositions are especially useful for extruding into articles and for application to structural plastics such as poly(vinyl chloride) to prepare composites. The invention also extends to methods for manufacturing such extruded articles and to composites produced therefrom.

Poly(vinyl chloride) resin (hereafter "PVC") has a combination of properties which make it particularly suitable for use as a structural material. In applications in which impact strength of the structural plastic is important, the PVC can be formulated with impact-modifier resins which improve the impact strength of the resulting composition. Such high impact-strength PVC compositions can be readily extruded or otherwise formed into a variety of articles which have excellent impact strength, toughness and other desired mechanical and chemical properties; for example as siding for buildings, shutters, technical profiles for window and door frames, rain carrying systems (e.g., gutters and downspouts), and fencings.

Such PVC compositions however have relatively poor weatherability characteristics, particularly poor color retention in darker grade colors such as browns and blues. The color is imparted to the PVC composition, for instance, by the use of colorants such as pigments or dyes, but exposure to sunlight causes unappealing changes in the colors. Such unappealing changes are more severe for darker than for light colors. Poor weatherability characteristics also causes reduction in impact strength leading to embrittlement and cracking and/or mechanical failure of the articles prepared from such compositions. Thus, there is a need for improving the weathering characteristics of such materials.

One remedy has been to incorporate stabilizing additives into the PVC composition, for example UV absorbers, thermal stabilizers and titanium dioxide. However, the resulting improvements to weatherability do not to meet the stricter industry-wide standards (Vinyl Siding Institute, January 1999, adopting ASTM D3679 performance specifications).

Another attempted remedy has been to apply another resinous material over the PVC to provide a surface that can withstand sunlight and other environmental conditions. Such a surfacing material is called "capstock". The capstock generally is much thinner than the substrate plastic, typically being about 10 to about 25% of the total thickness of the composite (i.e. the capstock and substrate plastic).

A suitable capstock material must possess a certain combination of processing properties and other physical, chemical, and aesthetic properties, including exceptional weathering characteristics such as excellent color retention and high impact strength. Moreover, the capstock also must not affect adversely those properties which make PVC such a widely used building material. In particular, the capstock compositions that are particularly aesthetically desirable do not have a shiny appearance but rather have a flat, or reduced gloss appearance.

Various types of polymer-based compositions have been disclosed for use as capstock, including PVC-based compositions and acrylic resin based compositions. A number of these polymer-based compositions are described in European Patent Application EP-A-473,379 which is incorporated herein by reference for its teaching of capstock compositions. This publication discloses a 20 capstock composition containing a blend of PVC resin and an acrylic copolymer. We have found, however, that the presence of PVC in capstock compositions such as those disclosed in EP-A-473,379 results in reduced weatherability. Moreover, the compositions according to this invention have a high gloss and therefore are not appropriate for certain applications (e.g., PVC siding and profile) in which a high gloss appearance is undesirable. Although this publication suggests that appearance can be controlled by the addition of flatting or matting agents, the addition of such components undesirably increases the cost and complexity of preparing capstock materials having reduced gloss.

Thus there is a need for a cost-effective, weatherable, capstock material having a high impact strength and adequate color retention, which also has a reduced, preferably low, gloss.

We have now discovered such a capstock composition that is capable of providing the requisite impact strength, high color retention, and reduced gloss without requiring additional PVC or flatting agents. This composition contains a particular combination of "high rubber core" and "medium rubber core" acrylic-based "core/shell" polymers.

We have also discovered that processing the newly discovered capstock compositions in a plastics forming device (i.e., an extruder), wherein the metering and melt temperatures are carefully controlled, provides a capstock having the requisite impact strength, high color retention, and reduced gloss without the addition of PVC or flatting agents.

Therefore, an object of the present invention is to provide a capstock composition having a particular combination of "high rubber core" and "medium rubber core" acrylic-based "core/shell" polymers capable of providing the requisite impact strength, high color retention, and reduced gloss without the addition of PVC or flatting agents.

A further object is to provide a process for preparing a capstock capable of providing the requisite impact strength, high color retention, and reduced gloss without the addition of PVC or flatting agents.

Another object of the invention is to provide a synthetic resin composite having a first layer of a reduced-gloss, weatherable, impact-resistant capstock composition and a second substrate layer of a thermoplastic resin.

These and other objects, as will become apparent from the following disclosure, are achieved by the present invention.

STATEMENT OF THE INVENTION

In the present invention, the problem of providing a weatherable, impact resistant capstock having low gloss is solved generally by providing a particular combination of "high rubber core" and "medium rubber core" acrylic-based "core/shell" polymers having high impact strength, high color retention, and reduced gloss.

Thus, in a first aspect of the present invention is provided a capstock composition including:

(A) from 70 to 99 parts by weight of a first core/shell polymer including
  (i) from 30 to 70 parts by weight of a core polymer including
    (a) from 45 to 99.9 parts by weight of units derived from at least one C1–C8 alkyl acrylate monomer,
    (b) from 0 to 50 parts by weight of units derived from at least one ethylenically unsaturated copolymerizable monomer different from the at least one C1–C8 alkyl acrylate monomer, and
    (c) from 0.1 to 5 parts by weight of units derived from at least one crosslinker or graftlinker, and
  (ii) from 30 to 70 parts by weight of a shell polymer grafted to the core polymer (A)(i) including
    (a) from 80 to 99 parts by weight of units derived from at least one C1–C8 alkyl methacrylate monomer, and
    (b) from 1 to 20 parts by weight of units derived from at least one ethylenically unsaturated copolymerizable monomer different from the at least one C1–C8 alkyl methacrylate monomer; and
(B) from 1 to 30 parts by weight of a second core/shell polymer including
  (i) from 70 to 92 parts by weight of a core polymer including
    (a) from 50 to 99.9 parts by weight of units derived from at least one C1–C8 alkyl acrylate monomer,
    (b) from 0 to 45 parts by weight of units derived from at least one ethylenically unsaturated copolymerizable monomer different from the at least one C1–C8 alkyl acrylate monomer, and
    (c) from 0.1 to 5 parts by weight of units derived from at least one crosslinker or graftlinker; and
  (ii) from 8 to 30 parts by weight of a shell polymer grafted to the core polymer (B)(i) including
    (a) from 50 to 100 parts by weight of units derived from at least one C1–C8 alkyl methacrylate monomer, and
    (b) from 0 to 50 parts by weight of units derived from at least one ethylenically unsaturated copolymerizable monomer different from the at least one C1–C8 alkyl methacrylate monomer,
    wherein the shell polymer (B)(ii) has a shell molecular weight in the range of from 25,000 to 350,000 g/mol.

In a second aspect of the present invention, there is provided a capstock composition including
(A) from 75 to 85 parts by weight of a first core/shell polymer including
  (i) from 35 to 65 parts by weight of a core polymer including
    (a) from 95 to 99.5 parts by weight of units derived from n-butyl acrylate,
    (b) from 0 to 4.5 parts by weight of units derived from at least one ethylenically unsaturated copolymerizable monomer different from n-butyl acrylate, and
    (c) from 0.5 to 2.5 parts by weight of units derived from allyl methacrylate, and
  (ii) from 55 to 65 parts by weight of a shell polymer grafted to the core polymer (A)(i) including
    (a) from 90 to 99 parts by. weight of units derived from methyl methacrylate, and
    (b) from 1 to 10 parts by weight of units derived from at least one C1–C8 alkyl acrylate monomer; and
(B) from 15 to 25 parts by weight of a second core/shell polymer including
  (i) from 75 to 85 parts by weight of a core polymer including
    (a) from 90 to 99.0 parts by weight of units derived from n-butyl acrylate,
    (b) from 0.5 to 2.0 parts by weight of units derived from trimethylolpropane triacrylate, and
    (c) from 0.0001 to 0.001 parts by weight of units derived from allyl methacrylate; and
  (ii) from 15 to 25 parts by weight of a shell polymer grafted to the core polymer (B)(i) including
    (a) from 95 to 100 parts by weight of units derived from at least one C1–C8 alkyl methacrylate monomer, and
    (b) from 0 to 5 parts by weight of units derived from at least one C1–C8 alkyl acrylate monomer,
    wherein the shell polymer (B)(ii) shell molecular weight is in the range of from 50,000 to 350,000 g/mol; and
(C) from 0.5 to 3.0 parts by weight of at least one UV light stabilizer.

In a third aspect of the present invention, there is provided a process for preparing a capstock capable of providing the requisite impact strength, high color retention, and reduced gloss including the steps of:
(I) preparing a mixture including
  (A) from 70 to 99 parts by weight of a first core/shell polymer including
    (i) from 30 to 70 parts by weight of a core polymer including
      (a) from 45 to 99.9 parts by weight of units derived from at least one C1–C8 alkyl acrylate monomer,
      (b) from 0 to 50 parts by weight of units derived from at least one ethylenically unsaturated copolymerizable monomer different from the at least one C1–C8 alkyl acrylate monomer, and
      (c) from 0.1 to 5 parts by weight of units derived from at least one crosslinker or graftlinker, and
    (ii) from 30 to 70 parts by weight of a shell polymer grafted to the core polymer (A)(i) including
      (a) from 80 to 99 parts by weight of units derived from at least one C1–C8 alkyl methacrylate monomer, and
      (b) from 1 to 20 parts by weight of units derived from at least one ethylenically unsaturated copolymerizable monomer different from the at least one C1–C8 alkyl methacrylate monomer; and
  (B) from 1 to 30 parts by weight of a second core/shell polymer including
    (i) from 70 to 92 parts by weight of a core polymer including
      (a) from 50 to 99.9 parts by weight of units derived from at least one C1–C8 alkyl acrylate monomer,
      (b) from 0 to 45 parts by weight of units derived from at least one ethylenically unsaturated copolymerizable monomer different from the at least one C1–C8 alkyl acrylate monomer, and
      (c) from 0.1 to 5 parts by weight of units derived from at least one crosslinker or graftlinker; and
    (ii) from 8 to 30 parts by weight of a shell polymer grafted to the core polymer (B)(i) including
      (a) from 50 to 100 parts by weight of units derived from at least one C1–C8 alkyl methacrylate monomer, and
      (b) from 0 to 50 parts by weight of units derived from at least one ethylenically unsaturated copolymerizable monomer different from the at least one C1–C8 alkyl methacrylate monomer,
      wherein the shell polymer (B)(ii) has a shell molecular weight in the range of from 25,000 to 350,000 g/mol;
(II) feeding the mixture into an extruder including a feed section and a metering section;
(III) metering and melting the mixture to form a melt, wherein the metering section has a temperature between 165° C. and 190° C., and the melt has a temperature between 165° C. and 195° C.;
(IV) forming the melt into a melt layer;
(V) extruding the melt layer; and
(VI) cooling the melt layer.

In a fourth aspect of the present invention, there is provided a synthetic resin composite including a substrate layer of an extrudable thermoplastic resin, and a capstock layer disposed thereon including a capstock composition of the first or second aspects of the present invention.

The term "reduced gloss" used herein refers to a surface having an average gloss value of 60 or less as measured with a 75 degree incident angle geometry glossmeter.

The term "medium rubber" used herein denotes a core/shell polymer having from 30 to 70 weight percent of a rubbery polymer component, whereas the term "high rubber" denotes a core/shell polymer having 70 or more weight percent of a rubbery polymer component.

The term "rubbery" used herein denotes the thermodynamic state of a polymer above its glass transition temperature.

The term "units derived from" used herein refers to polymer molecules that are synthesized according to known polymerization techniques wherein a polymer contains "units derived from" its constituent monomers.

The term "molecular weight" used herein refers to the weight average molecular weight of polymer molecules as determined by the gel permeation chromatography method.

The term "shell molecular weight" refers to the weight average molecular weight of the soluble polymer molecules which are obtained by dissolving an emulsion of the core/shell polymer particles in a suitable solvent (e.g., THF) and then separating (e.g., by filtration) the soluble polymer fraction from the insoluble polymer fraction. The weight average molecular weight of the soluble polymer is then determined by gel permeation chromatography to give the shell molecular weight.

The term "graftlinker" used herein refers to multi-functional monomers capable of forming multiple covalent bonds between polymer molecules of one type with polymer molecules of another type.

The term "crosslinker" used herein refers to multi-functional monomers capable of forming multiple covalent bonds between polymer molecules of the same type.

The term "alkyl (meth)acrylate" used herein refers to both alkyl acrylate and alkyl methacrylate monomer compounds.

The term "stage" used herein is intended to encompass its broadest possible meaning, including the meaning conveyed in prior art such as U.S. Pat. Nos. 3,793,402, 3,971,835, 5,534,594, and 5,599,854, which offer various means for achieving "staged" polymers.

The term "parts" used herein is intended to mean "parts by weight". Unless otherwise stated, "total parts by weight" do not necessarily add to 100.

The term "weight percent" used herein is intended to mean "parts per hundred" wherein the total parts add to 100.

DETAILED DESCRIPTION OF THE INVENTION

It has now been found that a particular combination of a first "medium rubber" acrylic-based core/shell polymer and a second "high rubber" acrylic-based core/shell polymer is capable of being processed to provide a weatherable, impact resistant capstock having the requisite impact strength, high color retention, and reduced gloss appearance. The capstock compositions of the present invention have from 70 to 99, preferably from 75 to 95, and most preferably 75 to 85 parts by weight of a first "medium rubber" core/shell polymer and from 1 to 30 parts, preferably from 5 to 30, and most preferably 15 to 25 parts by weight of a second "high rubber" core/shell polymer.

The first "medium rubber" core/shell polymers of the present invention can contain from 30 to 70, preferably from 35 to 60, and most preferably from 35 to 45 parts by weight of a rubbery core polymer and from 30 to 70, preferably 40 to 65, most preferably 55 to 65 parts by weight of a shell polymer grafted to the core polymer.

Such rubbery core polymers can contain from 45 to 99.9, preferably from 80 to 99.5, and most preferably from 94 to 99.5 parts by weight of units derived from at least one C1–C8 alkyl acrylate monomer, from 0 to 35, preferably from 0 to 20, most preferably from 0 to 4.5 parts by weight of units derived from at least one ethylenically unsaturated copolymerizable monomer different from the at least one C1–C8 alkyl acrylate monomer, and from 0.1 to 5, preferably from 0.5 to 2, most preferably from 0.5 to 1.5 parts by weight of units derived from at least one crosslinker or graftlinker.

Suitable C1–C8 alkyl acrylate monomers include, methyl-, ethyl-, propyl-, n-butyl, sec-butyl-, tert-butyl, pentyl-, hexyl-, heptyl-, n-octyl-, and 2-ethylhexyl-acrylate. N-butyl acrylate and ethyl acrylate monomers are preferred.

Suitable crosslinkers or graftlinkers include divinyl benzene, butylene glycol dimethacrylate, alkanepolyol-polyacrylates or alkanepolyol-polymethacrylates such as ethylene glycol diacrylate, ethylene glycol dimethacrylate, butylene glycol diacrylate, oligoethylene glycol diacrylate, oligoethylene glycol dimethacrylate, trimethylolpropane diacrylate, trimethylolpropane dimethacrylate, trimethylolpropane triacrylate ("TMPTA") or trimethylolpropane trimethacrylate, and unsaturated carboxylic acid allyl esters such as allyl acrylate, diallyl maleate, and preferably allyl methacrylate.

As long as the core polymer remains rubbery, the core polymer may also contain additional units derived from at least one ethylenically unsaturated copolymerizable monomer different from the C1–C8 alkyl acrylate monomers such as C1–C8 alkyl methacrylates, vinyl aromatic monomers, vinyl-unsaturated carboxylic acids monomers, and nitrogen-containing vinyl unsaturated monomers. Examples of the C1–C8 alkyl methacrylate monomers are ethyl methacrylate, propyl methacrylate, butyl methacrylate, hexyl methacrylate, octyl methacrylate, and preferably methyl methacrylate. Examples of vinyl aromatic monomers include styrene, alpha-methyl styrene, para-methyl styrene, chlorostyrene, vinyl toluene, dibromostyrene, tribromostyrene, vinyl naphthalene, isopropenyl naphthalene, divinylbenzene and the like. The C1–C8 alkyl (meth)acrylate monomers are preferred in view of their enhanced weatherability of acrylic units over the other monomers. Examples of vinyl-unsaturated carboxylic acids monomers include methacrylic acid and acrylic acid. Examples of nitrogen-containing vinyl unsaturated monomers include acrylonitrile, methacrylonitrile, C1–C8 alkyl acrylamides, and C1–C8 alkyl methacrylamides.

The shell polymer grafted to the core polymer of the first "medium rubber" core/shell polymers of the capstock composition of the present invention contain from 80 to 99, preferably from 85 to 97, and most preferably from 92 to 96 parts by weight of units derived from at least one C1–C8 alkyl methacrylate monomer, and from 1 to 20, preferably from 3 to 15, most preferably from 4 to 8 parts by weight of units derived from at least one ethylenically unsaturated copolymerizable monomer different from the at least one C1–C8 alkyl methacrylate monomer.

Suitable polymers for the outer shell of the first core/shell polymer require that they have a glass transition temperature ("Tg") above 20° C. and therefore may also contain one or more units derived from ethylenically unsaturated copolymerizable monomers which are different from the at least one C1–C8 alkyl methacrylate monomer.

Suitable ethylenically unsaturated copolymerizable monomers include one or more of any of the following monomers: C1–C8 alkyl (meth)acrylates, acrylonitrile, methacrylonitrile, divinyl benzene, alpha-methyl styrene, para-methyl styrene, chlorostyrene, vinyl toluene, dibromostyrene, tribromostyrene, vinyl naphthalene, isopropenyl naphthalene, as well as higher carbon (C9–C20) alkyl (meth)acrylates such as decyl acrylate lauryl methacrylate, lauryl acrylate, stearyl methacrylate, stearyl acrylate, isobornyl methacrylate, and the like. The C1–C8 alkyl (meth)acrylate monomers are preferred for their enhanced weatherability characteristics. Most preferred are the C1–C8 alkyl acrylate monomers.

The shell molecular weights of the shell polymer are in the range of from 10,000 to 1,000,000 and preferably in the range of from 50,000 to 500,000 g/mol. Controlling molecular weights in this range can be accomplished by one of various methods known in the art and is preferably accomplished by preparing the outer shell polymers in the presence of one or more chain transfer agents. Increasing the chain transfer agent amount lowers the shell molecular weight. The amount of chain transfer agent present can be in the range of from 0 to 5, and preferably from 0.001 to 1.0, weight percent based on shell polymer weight. These amounts are based on using common chain transfer agents such as the alkyl mercaptans; various chain transfer agents having lower chain transfer coefficients will require a concomitant increase in their amount in order to control shell molecular weight. Other ways of reducing molecular weight include increasing the polymerization temperature and/or with a gradual feeding of the monomers, increasing the initiator level, feeding in the shell monomers neat versus preemulsifying the monomers, and by controlling the degree of mixing of the reaction medium. If the amount of chain transfer agent is lower than 0.001 weight percent of the shell polymer weight then the shell molecular weight may not be well controlled leading to variability in the properties of the capstock composition, and requiring one or more other means of controlling shell molecular weight (i.e., increasing initiator level). If the amount of chain transfer agent is too high then the degree of grafting of the shell polymer is reduced.

Common chain transfer agents or mixtures thereof known in the art include the C4–C18 alkyl mercaptans, mercaptogroup-containing acids, thiophenols, carbon tetrabromide, carbon tetrachloride, and the like. They may be used alone or as mixtures thereof. Examples of the C4–C18 alkyl mercaptans include butyl mercaptan, hexyl mercaptan, n-octyl mercaptan, decyl mercaptan, lauryl mercaptan. t-dodecyl mercaptan and n-dodecyl mercaptan are preferred. Numerous chain transfer agents and their coefficients for controlling molecular weight are found in *The Polymer Handbook*, $3^{rd}$ Ed., Brandrup and Immergut, Eds., Wiley Interscience, 1989, pp. II/81–II/141, which is incorporated by reference to its disclosure of chain transfer agents and chain transfer constants.

The second "high rubber" core/shell polymers of the present invention contain from 70 to 92, preferably from 72 to 88, and most preferably from 75 to 85 parts by weight of a rubbery core polymer and from 8 to 30, preferably from 12 to 28, and most preferably from 15 to 25 parts by weight of a shell polymer grafted to the core polymer.

Such rubbery core polymers contain from 50 to 99.9, preferably from 80 to 99.9, and most preferably from 90 to 99.9 parts by weight of units derived from at least one C1–C8 alkyl acrylate monomer, from 0 to 45, preferably from 0 to 15, and most preferably from 0 to 5 parts by weight of units derived from at least one ethylenically unsaturated copolymerizable monomer different from the at least one C1–C8 alkyl acrylate monomer, and from 0.1 to 5, preferably from 0.5 to 2, most preferably from 0.7 to 1.5 parts by weight of units derived from at least one crosslinker and graftlinker. It is preferred that the rubbery core polymers contain from 0.0001 to 0.1 parts by weight total of units derived from at least one crosslinker and at least one graftlinker.

Typical C1–C8 alkyl acrylate monomers include, methyl-, ethyl-, propyl-, n-butyl, sec-butyl-, tert-butyl, pentyl-, hexyl-, heptyl-, n-octyl-, and 2-ethylhexyl-acrylate. N-butyl acrylate and ethyl acrylate monomers are preferred. Suitable crosslinker or graftlinker monomers include divinyl benzene, butylene glycol dimethacrylate, alkanepolyol-polyacrylates or alkanepolyol-polymethacrylates such as ethylene glycol diacrylate, ethylene glycol dimethacrylate, butylene glycol diacrylate, oligoethylene glycol diacrylate, oligoethylene glycol dimethacrylate, trimethylolpropane diacrylate, trimethylolpropane dimethacrylate, trimethylolpropane triacrylate or trimethylolpropane trimethacrylate, and unsaturated carboxylic acid allyl esters such as allyl acrylate, diallyl maleate, and allyl methacrylate. Although trimethylol propane triacrylate ("TMPTA") is the preferred crosslinker and allyl methacrylate is the preferred graftlinker, both may be used interchangeably in the same core/shell polymer.

As long as the core polymer remains rubbery, the core polymer of the second "high rubber" core/shell polymer may also contain additional units derived from at least one copolymerizable monomers such as C1–C8 alkyl (meth) acrylate, vinyl aromatic monomers such as styrene, vinyl-unsaturated carboxylic acids monomers such as methacrylic acid, and nitrogen-containing vinyl unsaturated monomers such as acrylonitrile. The C1–C8 alkyl (meth)acrylates are the preferred additional monomers in view of their superior weatherability.

The shell polymer grafted to the core polymer of the second "high rubber" core/shell polymers of the present invention contains from 50 to 100, preferably from 90 to 100, and most preferably from 98 to 99.9 parts by weight of units derived from at least one C1–C8 alkyl methacrylate monomer. The shell molecular weight is in the range of from 25,000 to 350,000, preferably in the range of from 50,000 to 200,000, and most preferably in the range of from 80,000 to 150,000 g/mol. If the shell molecular weight is too low then the degree of grafting is considerably reduced. If the shell molecular weight is too high then the average gloss becomes too high.

Shell molecular weights can be controlled by various methods known in the art, the most preferred method is to use a chain transfer agent in the amounts of from 0.005 to 5.0, preferably from 0.05 to 2.0, and most preferably from 0.1 to 2.0 weight percent based on shell polymer weight during the shell polymerization. A chain transfer agent may be used to control the molecular weight of the shell polymer and is important for providing capstock compositions that are both processable and which have a reduced gloss appearance. If less than 0.005 weight percent chain transfer agent is used then the shell molecular weight becomes too high and the viscosity increases, thereby resulting in greater energy needed for processing. If the chain transfer agent amount is greater than 5.0 weight percent then the degree of grafting of shell polymer becomes too low resulting in degraded performance.

Other ways of reducing molecular weight during typical emulsion polymerization processing include: increasing the polymerization temperature and/or with a gradual feeding of the monomers; increasing the initiator level; feeding in the shell monomers neat versus preemulsifing the monomers; and improving the degree of mixing of the reaction medium.

Suitable polymers for the outer shell of the second core/shell polymer require that they have a glass transition temperature ("Tg") above 20° C. and therefore may also contain one or more units derived from ethylenically unsaturated copolymerizable monomers which are different from the at least one C1–C8 alkyl methacrylate monomer.

Suitable ethylenically unsaturated copolymerizable monomers include one or more of any of the following monomers: C1–C8 alkyl (meth)acrylates, acrylonitrile, methacrylonitrile, divinyl benzene, alpha-methyl styrene, para-methyl styrene, chlorostyrene, vinyl toluene, dibromostyrene, tribromostyrene, vinyl naphthalene, isopropenyl naphthalene, as well as higher carbon (C9–C20) alkyl (meth)acrylates such as decyl acrylate lauryl methacrylate, lauryl acrylate, stearyl methacrylate, stearyl acrylate, isobornyl methacrylate, and the like. The C1–C8 alkyl (meth)acrylate monomers are preferred for their enhanced weatherability characteristics. Most preferred are the C1–C8 alkyl acrylate monomers.

One or more chain transfer agents can be used to control the molecular weight of the shell polymer of the second "high rubber" core/shell polymer. Common chain transfer agents or mixtures thereof known in the art include the C4–C18 alkyl mercaptans, mercapto-group-containing acids, thiophenols, carbon tetrabromide, carbon tetrachloride, and the like. They may be used alone or as mixtures thereof. Examples of the C4–C18 alkyl mercaptans include butyl mercaptan, hexyl mercaptan, n-octyl mercaptan, decyl mercaptan, lauryl mercaptan. t-dodecyl mercaptan and n-dodecyl mercaptan are preferred.

The invention also encompasses having other or additional stages, which are polymerized after the formation of the rubbery core stage. Such stages may include an additional rubbery stage of a poly(alkyl acrylate), or additional outer stages of polymer mainly or exclusively polymerized from C1–C4 alkyl methacrylate. Other multi-staged core/shell polymers are envisioned, i.e., hard-core/rubbery shell/hard shell polymers.

In preferred form, the first "medium rubber" core/shell polymer is an acrylic resin prepared according to the free-radical emulsion polymerization procedure described in U.S Pat. No. 3,812,205, which is incorporated herein by reference for its disclosure on the preparation of acrylic core-shell polymeric materials prepared with graftlinkers using emulsion polymerization techniques. The second "high rubber" acrylate-based core/shell polymer is also prepared by a free-radical polymerization as described in EP-A-850,740, which is incorporated by reference for its disclosure on the preparation of high rubber acrylic impact modifiers made using emulsion polymerization.

The core-shell polymers may be isolated from the emulsion in various ways, the preferred methods being spray-drying or coagulation, such as with electrolyte addition. Any of the various techniques described in the literature, such as U.S. Pat. No. 4,897,462, may also be applied to the emulsion during isolation to produce a spheroidal product which, when dried, exhibits outstanding powder flow, low dusting, and higher bulk density than conventionally isolated powders.

The capstock composition may further contain from 0 to 5, preferably from 0.5 to 3, most preferably from 1 to 2 parts by weight of at least one UV light stabilizer. Many suitable UV light stabilizers are described in "Plastics Additives and Modifiers Handbook, Ch. 16 Environmental Protective Agents", J. Edenbaum, Ed.., Van Nostrand (1992) pp. 208–271, which is incorporated herein by reference for its disclosure of UV light stabilizers. Preferred UV light stabilizers are of the HALS-, benzotriazole-, and benzophenone-type compounds. These compounds further enhance the weatherability of the capstock composition. Many such compounds are commercially available from Ciba Specialty Chemicals (Tarrytown, N.Y.) under the TINUVIN tradename.

The capstock composition may further contain from 0 to 100 parts by weight of at least one polyvinyl chloride resin ("PVC"). Because total parts by weight in the capstock composition do not necessarily add to 100, the addition of a maximum of 100 parts by weight PVC to the capstock composition results in a weight ratio of PVC to first and second core/shell polymers of 100:100, or about 50 weight percent. The addition of other components follows this weight fraction protocol. Although the addition of PVC has a tendency to reduce the gloss of the capstock, it also has the effect of reducing the ability of the capstock to withstand weathering.

The capstock composition may further contain from 0 to 20 parts by weight of at least one pigment. Many suitable pigments are described in "Plastics Additives and Modifiers Handbook, Section VIII, "Colorants"", J. Edenbaum, Ed., Van Nostrand (1992), pp. 884–954 which is incorporated herein by reference for its disclosure of various pigments useful for coloring plastics. Examples include organic pigments and inorganic pigments, and those preferred are resistant to UV and visible light exposure such as titanium dioxide (white), clays (beige) and slate blue pigment (blue).

The capstock composition may further contain from 0 to 15 parts by weight of at least one matting agent. Suitable matting agents include relatively large organic and inorganic particles (e.g., glass, ceramic and polymer) which are used for altering the light scattering properties in plastic resins. Numerous inorganic and polymeric matting agents for acrylic resins are described in U.S. Pat. No. 5,346,954 which is incorporated by reference for its disclosure of matting agents useful for blending with acrylic resins.

The capstock composition may further contain from 0 to 5 parts by weight of a powder flow aid. Suitable powder flow aids may be incorporated in the spray drying process used for recovering dry powder capstock composition. An example is stearic acid-coated calcium carbonate. Flow aids are further described in U.S. Pat. No. 4,278,576 which is incorporated by reference for its disclosure of flow aids useful for spray drying emulsions of core/shell polymers.

The process which has been found for preparing a capstock capable of providing the requisite impact strength, high color retention, and reduced gloss comprises the steps of first preparing a mixture (I) having a capstock composition according to the first aspect of the present invention. As described above, dry powders of the first and second core/ shell polymers can be prepared by recovering emulsion core/shell polymers either by spray drying or by coagulation followed by wet-cake drying. These core/shell polymers may be recovered separately as individual powders which are subsequently mixed together using a suitable powder mixing device (i.e., ribbon blender) to prepare a dry powder mixture. Alternatively, the first and second core/shell polymers may be blended in the emulsion state and subsequently recovered as a mixed dry powder blend by either co-spray drying or coagulation followed by drying.

Additional components in the capstock composition, such as UV stabilizers, pigments, PVC resin, matting agents, flow aids, processing aids, lubricants, fillers, and the like, may be blended in either powder or liquid form with the first and second core/shell polymers that comprise the base resin capstock composition. Individual additives, i.e., UV light stabilizer, may be emulsified, added to the core/shell emulsion polymers and co-spray-dried. Alternatively, emulsified additives, such as pigment dispersion may be added directly to core/shell polymer powder in a suitable mixing device which allows for the addition of heat and the removal of water. Likewise, PVC wetcake may also be blended with powder or aqueous-based core/shell polymers. Numerous combinations of mixing emulsion-based additives and powders followed by subsequent drying can be envisioned by one skilled in the art.

If a pelletized form of the capstock composition is preferred for preparing capstock film, sheet, and other various articles instead of a powder (e.g., to avoid dust), then the powder may be formed into pellets using any suitable plastics pelletization equipment and methods known in the plastics processing art. This can be especially useful in combination with the mixing step wherein the components of the capstock composition can be compounded (mixed) and pelletized using standard plastics processing equipment.

In step (II) the mixture (I) is fed into a plastics processing device, such as an extruder, which is well known to the plastics-processing art. Typically, an extruder having a feed section and a metering section is utilized. Further details can be found in *Principles of Polymer Processing*, by Z. Tadmor and C. G. Gogos, John Wiley, 1979.

An ideal set of extruder operating temperatures exists at which the capstock composition can be processed efficiently to create a reduced gloss appearance while maintaining high impact strength. The feed section temperature of the extruder is adjusted so that the pellets or powder of mixture (I) do not melt and stick in the feed throat In processing the mixture (I) there are sometimes problems with feeding the powder form into an extruder, which is exacerbated by relatively fast fusion (melting) of the mixture (I) causing the molten mixture to back up into the feed throat. Fine powder forms of (I) makes feeding onto the screw flights of the metering section difficult, particularly with smaller extruders which have shallow flight screws. Reducing the feed section temperature partially alleviates this problem and output is improved, but the gloss, though reduced by the lower processing/melt temperature can be too high. Thus, even lower processing temperatures are needed to ensure that the gloss is low enough but this causes a low throughput problem. In order to increase throughput, the fusion of (I) should be delayed.

Optionally, addition of relatively small amount of an external lubricant, such as an oxidized polyethylene wax, helps to increase the fusion time and to reduce clogging of partially fused polymer in the feed throat. The addition of an external lubricant therefore helps to provide a higher output.

It is important that during the step (III) of metering and melting the mixture (I) in the metering section to form a melt, the temperature of the metering section must be kept between 165° C. and 190° C., preferably between 170° C. and 185° C., and most preferably between 175° C. and 180° C. If the metering section temperature is too low then the capstock will have poor impact; higher temperatures can help improve impact strength, but too high temperatures can lead to higher gloss.

The melt temperature must be kept between 165° C. and 195° C., preferably between 170° C. and 190° C., and most preferably between 170° C. and 188° C. If the temperature is above 195° C. then the gloss increases to an unacceptable level. However, if the melt temperatures is too low then the viscosity of the resin becomes too great and the flowrate through the plastics processing device must be reduced to avoid viscous heating which deleteriously reduces process efficiency.

The step (IV) of forming the melt into a melt layer in a die located at the end of the extruder is done within a suitable plastics forming device, such as a die, as is known in the art (See Id., Ch. 13, "Die Forming"). For preparing capstock it is best to form the melt into a thickness of from 0.1 to 1.0 mm thick, which is useful as protective layers for PVC building products (e.g., PVC siding, window frames, fencing, decking, and rain gutters).

The steps (V) of extruding the melt layer from the die and (VI) of cooling the melt layer after it exits the die are also known plastics processing steps. Cooling the extruded melt layer can occur by passing the melt layer through a cooling fluid medium such as a liquid (i.e., water) or a gas (i.e., air) having a temperature sufficiently low to cause the capstock to harden. The temperature of the cooling fluid should be kept below the hardening temperature, i.e. Tg, of the polymeric component having the highest Tg in the composition. As an example, capstock compositions including core/shell polymers having PMMA shells of a Tg of about 100° C. and require a cooling fluid, i.e., water, having a temperature of about 80° C. or less.

Alternatively from, or in addition to using a cooling fluid, the melt layer can be passed and/or pressed between chilled rollers which may be polished smooth and/or have an embossing pattern. It is particularly preferable for capstock used for PVC siding applications to have rollers that provides an embossing pattern that produces a wood-grain effect into the capstock. Other embossing patterns are also envisioned for the chiller rollers, such as a matte finish. Such wood grain effect and matte-finish embossing patterns also tend to further reduce the gloss of the capstock and are therefore particularly desirable for use in the cooling step (VI) of preparing reduced-gloss weatherable impact-resistant capstock.

A method for making a synthetic resin composite is also envisioned which involves extruding a plurality of thermoplastic extrusion compounds and applying them together in a particular fashion. At least one of the thermoplastic extrusion compounds will be the capstock composition according to the first or second aspects of the present invention and disposed upon at least one other thermoplastic extrusion compound functioning as at least one substrate layer. It is also envisioned that the capstock composition can be extruded in multiple layers to allow for additional protection on one or more sides of the composite.

A typical capstock can be from 0.1 to 1.0 mm thick, whereas the structural plastic can be about 0.8 to 1.2 mm thick for PVC siding applications, and from 1.2 to 3.0 mm for PVC profile applications (e.g., PVC window frames, fencing, decking, and rain gutters). If the capstock and substrate are too thick then the articles made therefrom will suffer too great cost, whereas if they are too thin then they will be lacking in strength.

The substrate layer may also be formed by an extrusion of a thermoplastic resin. The thermoplastic resin may be any of the extrudable thermoplastic resins known in the art, examples of which are described in U.S. Pat. No. 5,318,737, incorporated herein by reference for its disclosure of extrudable resins and extrusion processes.

Preferred extrudable thermoplastic resins which are especially useful for making building products, but which require protection from a capstock layer against weathering and physical impacts, include PVC, chlorinated polyvinylchloride ("CPVC"), high impact polystyrene ("HIPS"), polypropylene ("PP") and acrylonitrile-butadiene-styrene ("ABS"). It is also preferred that the extrudable thermoplastic resins of the capstock and substrate layers adhere to one another to prevent delamination of the composite. Adhesion can be promoted through selection of resins which are compatible and/or miscible with one another (e.g., polymethyl methacrlyate-based resins and chlorinated resins). Various methods known in the art, such as surface treatment with adhesion promoters (i.e., corona discharge) and/or application of an adhesive, are envisioned for improving the adhesion between the substrate and capstock layers of the composite.

Synthetic resin composites can have a substrate layer of an extrudable thermoplastic resin, and a capstock layer of the capstock composition according to the first aspect of the present invention disposed thereon. The composites can be formed for example, by laminating preformed sheets or films of PVC structural plastic and the capstock together by thermal fusion or by adhesive.

Preferred extrudable thermoplastic resins used as the substrate layer include PVC, CPVC, HIPS, PP and ABS. Preferably, the capstock layer has an average gloss measured at a 75 degree incident angle geometry of less than 60, preferably less than 50, and most preferably below 45. Also, the capstock layer is preferred to have a drop dart impact strength of greater than 25 in-lbs at 23° C. according to D4226. It is also preferred that the capstock layer has a ΔE value of 8.0 or less and a ΔL value of 2.0 or less after 1000 hours of accelerated weathering according to ASTM D4329 Cycle C.

EXAMPLES

Apparatus and General Procedure

In the following Examples, the core-shell polymers were prepared using a free-radical polymerization process in an appropriate kettle equipped with a, stirrer, means for controlling the reactor temperature, means for dropping the formed polymer emulsion to a container, means for recording temperature, means for adding emulsifier solution, means for adding initiator, and means for adding monomers.

Particle size of the emulsion particles was measured using a Nanosizer BI-90 (Brookhaven Instruments, Holtsville, N.Y.).

Polymer powders were prepared according to the spray-drying process described in U.S. Pat. No. 4,278,576; from 0 to 3% by weight of a calcium carbonate flow aid was optionally added to the emulsion during spray drying. Powder particle sizes were measured using a Coulter Laser Particle Size Analyzer, Model LS-130 instrument (Beckman Coulter, Inc., Fullerton, Calif.).

Dry powders were mixed to form dry powder mixtures without melting using a high intensity mixer. Dry powder mixtures were melt blended using a Collin Mill (W. H. Collin GmbH Maschinenfabrik, Aichach, Germany) at 175° C. for 7.5 minutes. Test plaques were prepared using a Reliable Press (Reliable Press Co., Cleveland, Ohio) operating at a temperature of 190° C. The pressing operation applied 10 tons for 3 minutes, followed by 70 tons for 2 minutes and a 3-minute cooling period (room temperature) at 70 tons. Plaques were cut to produce specimens for QUV accelerated weathering analysis and notched Izod impact strength (ASTM D256) testing (6.5×10×⅛ inches) and for Drop Dart Impact Testing (6.5×10×1 mm) (ASTM D4226A).

QUV accelerated weathering was done according to ASTM D4329 Cycle C (Q-UVA 340 light source; eight hours light, four hours dark with condensation at 50° C.).

Color-hold was measured by determining changes in light transmission and color as a result of the QUV accelerated weathering using a Hunter Lab calorimeter (Hunter Associates Laboratory, Inc., Reston, Va.) to measure the ΔE, ΔL, Δa, and Δb values. The procedure for determining these values are provided in Instruction Manual: HUNTERLAB TRISTIMULUS COLORIMETER MODEL D25P-9 (rev. A). Measurements were made every 500 hours of QUV exposure up to 5000 hours total exposure.

Average gloss values were measured using a 75 degree incident angle geometry glossmeter (BYK-Gardner USA, Chicago, Ill.).

The following abbreviations are employed in the examples:

ALMA=allyl methacrylate
BA=butyl acrylate
TMPTA=trimethylolpropane triacrylate
MMA=methyl methacrylate
pMMA=poly(methyl methacrylate)
pBA=poly(n-butyl acrylate)
CHP=cumene hydroperoxide
EMM=emulsified monomer mixture
nDDM=n-dodecyl mercaptan
tDDM=tert-dodecyl mercaptan
SFS=sodium formaldehyde sulfoxylate
NaPS=sodium persulfate
rpm=revolutions per minute In the description of the compositions, a single slash ("/") implies a copolymer, numbers separated by a single slash within parentheses indicates the copolymer weight ratio of the particular stage, while a double slash ("//") implies a separate stage. The general format for describing the core-shell polymer compositions is thus "core composition" // "shell composition". Numbers refer to parts by weight and don't necessarily sum to 100. The amount of chain transfer agent used during the polymerization of the shell polymers is also indicated in the composition as parts by weight.

Examples 1 (a–c)

Preparation of First "Medium Rubber" Core/shell Polymers

Example 1a

Preparation of 40 (99 BA/1 ALMA)//60 (95 MMA/5 BA/0.002 nDDM), a first core/shell polymer having 60% MMA-co-BA shell polymer, shell molecular weight about 115,000 g/mol, grafted to 40% graftlinked pBA core polymer: Stage 1. A first-stage monomer emulsion was prepared by blending 200 parts of butyl acrylate, 1.8 parts of allyl methacrylate, 1.85 parts of dioctyl sulfosuccinate (75% solution in ethanol), and 50 parts of de-ionized water. A reactor containing 370 parts of de-ionized water and 0.074 parts of acetic acid was heated to 62° C. while its contents were sparged with nitrogen for 30 minutes. At 62° C., 0.11 parts of sodium formaldehyde sulfoxylate dissolved in 3 parts de-ionized water (4% solution) were charged to the reactor, followed by the addition of 11.5 parts of a polymer emulsion latex (33% polymer by weight, 0.040 mm) consisting of polyethyl acrylate-co-methyl methacrylate (50/50). The initially prepared monomer emulsion and 0.24 parts of t-butyl hydroperoxide initiator were then separately fed into the reaction vessel over 60 minutes. The polymerization reaction reached a peak temperature, which was then adjusted to 85° C. at the end of the monomer and initiator feeds. To complete the first-stage core polymerization 0.037 parts of sodium persulfate was added to the kettle at 85° C., and the reaction held for 10 minutes. The particle size of the core at the end of this first stage was 145–155 nm.

Stage 2. A second monomer mixture for preparing the shell polymer was prepared by blending 5.2 parts of dioctyl sulfosuccinate solution, 283 parts of methyl methacrylate, 14.8 parts of butyl acrylate, and 0.59 parts of n-dodecyl mercaptan. After the stage 1 completion, 29 parts of sodium formaldehyde sulfoxylate solution (2% by weight in water) was added to the reactor at 85° C. This addition was followed by gradual feed of the second monomer mixture and a cofeed of 28 parts of t-butyl hydroperoxide solution (8.5% in water) over 2.5 hours. The reaction was maintained at 85° C. and held at this temperature an additional 30 minutes at the end of the feeds. The reaction mixture was subsequently cooled (reaction cooldown). The total solids weight fraction was 49–50%, the final particle size at the end of the second stage was 180–200 nm, and the pH was 2.7–3.0.

Example 1b

Preparation of 40 (99 BA/1 ALMA)//60 (95 MMA/5 BA/0.002 nDDM), a first core/shell polymer having 60% pMMA-co-BA shell polymer, shell molecular weight about 130,000 g/mol, grafted to 40% graftlinked pBA core polymer: A two-stage polymer latex to prepare a first core/shell polymer was produced in the manner described in Example 1a with the following exceptions: The second monomer mixture was prepared as above with an additional charge of 13.25 parts of de-ionized water. Additionally, a sodium persulfate chase solution (0.037 parts sodium persulfate dissolved in 1 part de-ionized water) was added to the kettle at 85° C. at the end of the 2.5-hour stage 2 feed.

Part of this core/shell polymer latex was subsequently spray-dried into a dry powder, as described above. The resulting dry powder was somewhat dusty and had an average Coulter particle size of 33.2 microns.

Example 1c

Preparation of 40 (99 BA/1 ALMA)//60 (88.5 MMA/11.5 BA/ 0.002 tDDM), a first core/shell polymer having 60% pMMA-co-BA shell polymer, shell molecular weight about 160,000 g/mol, grafted to 40% graftlinked pBA core polymer: A first core/shell polymer was produced in the manner described in Example 1 of U.S. Pat. No. 3,812,205 with the following exceptions: The latex core polymer was composed of a core polymer containing 40% by weight of 100 parts butyl acrylate and 1 part of allyl methacrylate, and a shell polymer containing 60% by weight of 88.5 parts methyl methacrylate and 11.5 parts butyl acrylate. This latex was spray-dried into a dry powder.

Examples 2 (a–b)

Preparation of Second "High Rubber" Core/shell Polymers

Example 2a

Preparation of 79 (98.9 BA/1.1 TMPTA/0.0003 ALMA)//21 (100 MMA/0.005 nDDM), a second core/shell polymer having a 21% pMMA shell polymer, shell molecular weight about 130,000 g/mol, grafted to 79% crosslinked and graftlinked pBA core polymer: Stage 1: To an appropriate stirred reactor fitted with means for nitrogen addition, a reflux condenser, and means for adding monomers and other ingredients, was charged 49.3 parts of deionized water and 0.021 parts of glacial acetic acid and heated to 45° C. while sparging with nitrogen. The nitrogen was then adjusted to sweep the atmosphere over the reaction mixture. 0.100 parts SFS in 2.33 parts of deionized water was prepared and added to the reactor. 12.6 parts of an acrylic seed emulsion was added to the reactor. 10% of an EMM (containing 1.43 parts of a 28% aqueous mix of SLS, 21.8 parts of deionized water, 78.2 parts BA, and 0.867 parts trimethylolpropane triacrylate), was added to the reactor and rinsed with 0.699 parts of deionized water. 0.110 parts of CHP was then prepared and added to the reactor. The added initiator caused the reaction mixture to exotherm. In a similar manner, two additional EMM and CHP charges were added: the second comprised of 20% of the EMM and 18% of the CHP charges described above, the third comprised of 40% of the EMM and 39% of the CHP. For the fourth and final EMM addition, the remaining 30% of the EMM was modified, by adding 0.023 parts of allyl methacrylate before the EMM was added to the reactor. This was rinsed in with 2.69 parts of deionized water. The remaining 32% of the CHP was then added. Stage 2: After exotherming, the latex emulsion was cooled to 55° C. in preparation for the second stage. After cooling, 0.023 parts of SFS dissolved in 1.13 parts of deionized water, 20.9 parts of MMA, and 0.1 parts of n-DDM were added. These were rinsed in with a total of 2.31 parts of deionized water. Then 0.023 parts of NaPS dissolved in 1.13 parts of deionized water was added. The reactor was cooled to 35° C. The final particle size was about 250 nm and the solids fraction was 52–55% by weight. Part of this second core/shell polymer latex was subsequently spray-dried into a dry powder.

Example 2b

Preparation of 79 (98.9 BA/1.1 TMPTA/0.0003 ALMA)//21 (100 MMA/0.00005 nDDM), a second core/shell polymer having a 20% pMMA shell polymer, shell molecular weight about 500,000 g/mol, grafted to 80% crosslinked and graftlinked pBA core polymer: A two-stage polymer latex to prepare a second core/shell polymer was produced in the manner described in Example 2a with the exception that the amount of nDDM chain transfer agent used in the second stage was 1/100 as the amount used in Example 2a. Part of this second core/shell polymer latex was subsequently spray-dried into a dry powder.

Example 3a

UV stabilizer incorporation into Example 1b: To a solution containing 7 parts of sodium dodecyl benzenesulfonate (23% solution in water) and 15 parts of de-ionized water was added 6.3 parts of TINUVIN 571 and 1.85 parts of TINUVIN 123. The components were mixed in a blender using 1500 rpm mixing with a stainless steel propeller blade for 10–15 minutes. The mixture was slowly added to the reaction flask containing the latex polymer described in Example 1b at a temperature above 60° C. during reaction cooldown.

Example 3b

Preparation of a weatherable reduced gloss capstock composition with pre-emulsified UV stabilizer incorporation: A mixture of 6.3 parts of TINUVIN 328, 1.85 parts of TINUVIN 770, and 8.15 parts epoxidized soybean oil was preheated to 72° C. while stirring slowly until a clear melt was formed. At 72° C., 14.2 parts of sodium dodecyl benzenesulfonate (23% solution) were added to the melt slowly while stirring at 1500 rpm. The resulting creamy emulsion was stirred an additional 10 minutes, to which 26 parts of de-ionized water was added and stirred another 20 minutes at a temperature >60° C. The mixture was added during the cooldown phase of the reaction type described in Example 1b.

Example 4a

Preparation of Impact-Modified, Weatherable, Reduced gloss Capstock Dry Powder Mixture: The core/shell polymer latex of Example 1b was blended with the emulsion form of Example 2a (55% polymer weight) in a ratio of 80:20 parts by polymer weight. This latex blend was spray-dried into a dry powder having an average particle size of 56.3 microns. This dry powder blend was less dusty and had better handling properties than the dry powder of Example 1b.

Example 4b

Preparation of UV-Stabilized, Impact-Modified, Weatherable, Reduced gloss Capstock Composition: The latex prepared in Example 3a could be blended with the emulsion form of Example 2a in the 80:20 solids weight ratio just described. This UV-stabilized blend can then be co-isolated by spray drying.

Example 4c

Preparation of UV-Stabilized, Impact-Modified, Weatherable, Reduced gloss Capstock Dry Powder Mixture: 80 parts of the first core/shell polymer powder in Example 1b were blended with 20 parts of the second core/shell polymer powder described in Example 2a, along with 0.7 parts of TINUVIN 328, and 0.2 parts of TINUVIN 770 using a high intensity mixer to prepare a dry powder mixture for preparing a weatherable reduced-gloss high-impact capstock material.

Example 4d 100 parts of the powder from Example 4a was further mixed with 0.7 parts TINUVIN 328 and 0.2 parts TINUVIN 770 using a ribbon blender to produce a dry powder mixture for preparing a weatherable reduced-gloss high-impact capstock material.

Example 4e

Preparation of UV-Stabilized, Impact-Modified, Weatherable, Reduced-Gloss Capstock Dry Powder Mixture: The latex of Example 1b was blended with the emulsion form of Example 2a (55% polymer weight) and a flow aid (Winnofil F, ICI) in a ratio of 80:20:1.3 parts by solids weight. This latex blend was spray-dried into a dry powder having an average particle size of 61 microns. This dry powder blend had even better handling properties than the dry powder of Example 4a.

Example 4f 80 parts of the first core/shell polymer powder in Example 1c was blended with 20 parts of the second core/shell polymer powder described in Example 2a, along with 0.7 parts of TINUVIN 328, and 0.2 parts of TINUVIN 770 using a high intensity mixer to prepare a dry powder mixture for preparing a weatherable reduced-gloss high-impact capstock material.

Comparative Example 4g 80 parts of the first core/shell polymer powder in Example 1c was blended with 20 parts of the second core/shell polymer powder described in Example 2b, along with 0.7 parts of TINUVIN 328, and 0.2 parts of TINUVIN 770 using a high intensity mixer to prepare a dry powder mixture for preparing a weatherable reduced-gloss high-impact capstock material.

Example 5a

Preparation of Capstock Containing a First Core/Shell Polymer, a Second Core/Shell Polymer, a UV Stabilizer, and Pigments: A dry powder mixture was prepared containing 75 parts of the first core/shell polymer powder of Example 1b, 18.8 parts of the spray-dried second core/shell polymer of Example 2a, 0.2 parts TINUVIN 770, 0.7 parts of TINUVIN 328, 4 parts of white $TiO_2$ pigment and 1.3 parts of blue pigment (Penn Slate). This dry powder mixture was blended using a Collin Mill at 175° C. for 7.5 minutes. Plaques (6.5×10×⅛ inches) were prepared using a Reliable Press operating at a temperature of 190° C. The pressing operation applied 10 tons for 3 minutes, followed by 70 tons for 2 minutes and a 3-minute cooling period (room temperature) at 70 tons. The same plaque was cut to produce samples for both notched Izod impact and QUV accelerated weathering analysis.

Test results for this pigmented, UV stabilized capstock are as follows:

Izod Impact Strength (23° C.): 1.9 ft-lbs/in, no hinged breaks.

QUV weather testing after 1000 hours: $\Delta L=-0.37$, $\Delta a=-0.03$, $\Delta b=-0.02$.

Example 5b

Preparation of Capstock Containing a First Core/Shell Polymer, a Second Core/Shell Polymer, and a Polyvinyl Chloride Resin: Milled and molded plaques containing a blend of first and second core/shell polymers and a PVC resin and UV stabilizers were prepared as follows. To 40 parts of the first core/shell polymer powder obtained from Example 1c was added 50 parts of PVC powder and 10 parts of the second core/shell polymer powder of Example 2a. The plaque was prepared using the powder blending and pressing conditions as described in Example 5a. Test results are presented in Table 1.

Comparative Example 5c

As a comparison, a dry powder blend containing 50 parts of a commercially-obtained UV-stabilized ASA granular powder resin (GELOY 1020, GE Plastics) blended with 50 parts PVC as the capstock polymer was also prepared and tested. Plaques were prepared using the powder blending and pressing conditions as described in Example 5a. These plaques were tested for their % hinged breaks and notched impact strength. Results are presented below in Table 1.

Comparative Example 5d

As a comparison, a dry powder blend containing 50 parts of PVC resin and 50 parts of the second core/shell polymer of Example 2a was prepared and tested. A plaque was prepared using the powder blending and pressing conditions as described in Example 5a. Izod impact results for these PVC-containing samples are listed below in Table 1.

TABLE 1

| Ex. | Various resins and PVC (50/50 parts by weight) | % Hinged Breaks | Notched Izod Impact (ft-lbs/in of notch) | Temp. (° C.) |
|---|---|---|---|---|
| 5b | First and Second Core/Shell Polymers (40/10) and PVC | 100 | 14.28 | 23 |
| Comp. 5c | ASA Resin and PVC | 0 | 2.32 | 23 |
| Comp. 5d | Second Core/Shell Polymer and PVC | 100 | 5.23 | 23 |

The results in Table 1 show that the blend of first and second core/shell polymers with PVC (Ex. 5b) has superior notched Izod impact strength in comparison to previously-known blends such as ASA ("GELOY 1020")/PVC (Comp. Ex. 5c) or such blends containing PVC and only the second core/shell polymer as prepared according Example 2a (Comp. Ex. 5d).

Examples 6 (a–d)

Processing Weatherable High-Impact Capstock Composition to Provide Reduced-Gloss Appearance (Unpigmented)

Example 6a

The dry powder mixture as described in Example 4d was extruded into a weatherable reduced-gloss high-impact capstock sheet having a thickness of about 0.125 mm to about 1.00 mm from a 25 mm KMDL conical counter-rotating twin screw extruder (Krauss Maffei Corp., Florence, Ky.) fitted with a 6-inch wide die. After exiting the 6-inch wide die the sheet was passed between chrome polished take-off rolls to produce a smooth non-embossed surface. The extrusion conditions were as follows: 30 rpm screws; 5.2–5.6 extruder amp load; 172–190 kg/cm$^2$ melt pressure at die entry point; 30 inch Hg vacuum at vent; 185° C. melt temperature; extruder temperatures: 140° C. screw oil; 155° C. feed section; 175° C. metering section; 182° C. die zone. At these conditions the sheet had an average gloss value of 45.

Comparative Example 6b

Capstock formulations extruded into non-embossed sheet wherein the metering and melt temperatures are too high: Example 6a was repeated except that the extrusion conditions were: 30 rpm screws, 6.4–6.8 extruder amp load, 196–214 kg/cm$^2$ melt pressure at the die entry point, 30 inch Hg vacuum at vent, 195° C. melt temperature; extruder temperatures: 165° C. screw oil, 175° C. feed section; 190° C. metering section; 182° C. die zone. At these conditions the sheet imparted an average gloss value of 66.

Example 6c

Capstock formulations extruded into embossed (wood-grain effect) sheet using a larger extruder: Example 6a was repeated except that the extruder was a 35 mm counter-rotating twin screw extruder (CM-35) having a 6-inch wide sheet die, and the extruded sheet was passed between an embossing roll to create a wood grain appearance on the top surface and a smooth polished roll contacting the bottom surface of the sheet. Extrusion conditions were: 400 rpm, motor rotation, 15 amp load, 3200–3500 psi melt pressure at die entry point, 30 inch Hg vacuum at vent, 182° C. melt temperature. Extruder temperatures were: 138° C. screw oil, 120° C. feed section, 177° C. center zone, 182° C. metering section, 185° C. die zones (body and lips). At these conditions the sheet had an average gloss value of 47.

Example 6d

Capstock formulations extruded into embossed (wood-grain effect) sheet using a larger extruder at a higher melt temperature: Example 6c was repeated with the following conditions: Extrusion conditions were: 400 rpm, motor rotation, 12 amp load, 3100–3300 psi melt pressure at die entry point, 30 inch Hg vacuum at vent, 190° C. melt temperature. Extruder temperatures were: 150° C. screw oil, 160° C. feed section, 182° C. center zone, 182° C. metering section, 193° C. die zones (body and lips). At these conditions the sheet had an average gloss value of 53.

The results of the above extrusion process conditions are summarized in Table 2. Inspection of these results indicates that the average gloss is most sensitive to the metering section and melt temperatures; average-gloss values below 60 ("reduced-gloss") are obtained when the metering section temperature is kept below 190° C., and the melt temperature is kept below 195° C.

TABLE 2

Unpigmented Capstock Gloss versus Process Temperature

| | Extrusion Process Temperature, ° C. | | | | |
|---|---|---|---|---|---|
| Ex. | Feed Section | Metering Section | Melt | Die Zone | Average Gloss |
| 6a | 155 | 175 | 185 | 182 | 45 |
| 6b (Comp.) | 175 | 190 | 195 | 182 | 66 |
| 6c | 120 | 182 | 182 | 185 | 47 |
| 6d | 160 | 182 | 190 | 193 | 53 |

Examples 7 (a–o)

Capstock Compositions Further Containing Pigments and/or Matting Agents and/or PVC and/or Processing Aids Various capstock compositions were formulated with pigments, matting agents, PVC, and processing aids as shown in Table 3. 100 parts by weight base capstock formulations containing: 73.6 parts of a first core/shell polymer, 18.7 parts of a second core/shell polymer, 0.2 parts TINUVIN 770DF, 0.7 parts TINUVIN 328, 0.3 parts glycerol monostearate, 4.0 parts titanium dioxide pigment (Ti-Pure R960, DuPont, Wilmington, Del.) and 2.5 parts of clay pigment (Holcobatch Clay, Holland Colours Americas, Inc. Richmond, Ind.) were dry blended in a ribbon blender. The combination of the titanium dioxide and clay pigments gave a beige tone to the capstock. Additional parts of matting agent, processing aid, and PVC were added to the 100 parts base capstock formulations as indicated in Table 3 to prepare capstock compositions. These compositions were subsequently extruded into 1.0 mm thick capstock according to the process described in Example 6c and/or Example 6d as shown in Table 3. Commercially-available ASA and acrylic resins were similarly formulated into capstock compositions and extruded into capstock and tested as comparisons. The drop dart impact strength and average gloss of all of these capstocks were measured and recorded in Table 3.

The results in Table 3 indicate that the core-shell polymers of Examples 4a, 4e, and 4f are best at providing both high impact and reduced gloss capstock than either the comparative core/shell polymer blend of Comparative Example 4g or the commercially available ASA and acrylic materials. The results in Table 3 also show that addition of PVC to the core/shell polymer blends of Example 4e not only reduces the average gloss values but also substantially increases the drop dart impact strength of the capstocks, which is not observed for either the ASA or Impact Modified Acrylic commercial resins. Also, the addition of matting agent into the core/shell polymer blends is shown to substantially reduce the gloss without reducing the drop-dart impact strength.

TABLE 3

Impact and Gloss Properties of Various Embossed Pigmented (Beige) 1.0 mm Thick Capstocks

| | Pigmented Capstock Composition | | | Extruder Conditions Used | | | |
| | 100 Parts Base Capstock Formulation | | | Example 6c | | Example 6d | |
| | Capstock | Additional Parts | | Drop Dart | | Drop Dart | |
| Ex. | Resin Source: | Matting Agent[a] | PVC | Impact in-lbs | Avg. Gloss | Impact in-lbs | Avg. Gloss |
|---|---|---|---|---|---|---|---|
| 7a | Ex. 4a | 0 | 0 | 39 | 51 | — | — |
| 7b | Ex. 4a[b] | 0 | 0 | 28 | 48 | — | — |
| 7c | Ex. 4e | 0 | 0 | 27 | 48 | — | 53 |
| 7d | " | 3 | 0 | 29 | 32 | — | 51 |
| 7e | " | 5 | 0 | 27 | 28 | — | 40 |
| 7f | " | 0 | 10 | 49 | 28 | — | — |
| 7g | " | 0 | 20 | 52 | 22 | — | — |
| 7h | " | 0 | 30 | 59 | 17 | — | — |
| 7i | Ex. 4f | 0 | 0 | — | — | 54 | 60 |
| Comp 7j | Comp. Ex. 4g[c] | 0 | 0 | — | — | 38 | 71 |
| Comp 7k | ASA[d] | 0 | 0 | — | 65 | — | — |
| Comp 7l | " | 0 | 10 | 21 | 23 | — | — |
| Comp 7m | " | 0 | 50 | 23 | 17 | — | — |
| Comp 7n | Impact-Modified Acrylic | 0 | 0 | 18 | 47 | — | — |
| Comp 7o | Impact-Modified Acrylic | 0 | 10 | 15 | 46 | — | — |

[a]PARALOID EXL-5136 matting agent, Rohm and Haas Company
[b]Contains 1.5% by weight resin PARALOID K-175 Processing Aid. Rohm and Haas Company
[c]"High rubber" second core/shell polymer having a shell molecular weight of about 500,000 g/mol
[d]GELOY 1020 resin (GE Plastics)
[e]TUFCOAT 4600 resin (ICI Acrylics)

Examples 8 (a–f)

QUV Weatherability Testing of Various Dark Blue Gray Pigmented Capstock Compositions The compositions formulated as indicated in Examples 8 (a–f) were extruded into 1 mm thick test specimens and subjected to accelerated weathering for up to 4500 hours (ASTM D4329 Cycle C) and the color-hold was measured. Results are shown in Table 4.

Example 8a

A pigmented, UV stabilized capstock composition was prepared with 94.4 parts of powder from Example 4c, 0.3 parts of glycerol monostearate, 4.0 parts of titanium dioxide pigment, and 1.3 parts of a slate blue pigment (Penn Color, Doylestown, Pa.).

Example 8b

A pigmented, UV stabilized capstock composition was prepared with 48.75 parts of powder from Example 4c, 48.75 parts of a pigmented PVC resin formulation [PVC 100 parts, TM-181 1.0 parts, calcium stearate 1.3 parts, Wax 165 1 parts, AC629A 0.1 parts, titanium dioxide pigment 10.0 parts, PARALOID K-175 processing aid (Rohm and Haas Company, Philadelphia, Pa.)], and 1.3 parts of slate blue pigment.

Reference Example 8c

As a reference, a pigmented PVC resin was formulated with 97.3 parts of the PVC resin formulation described in Example 8b having an additional 5.0 parts of PARALOID KM-377 acrylic impact modifier (Rohm and Haas Company, Philadelphia, Pa.), and a total of 2.7 parts of slate blue pigment.

Comparative Example 8d

As a comparison, a pigmented capstock composition was prepared with 94.7 parts of an impact-modified acrylic resin (TUFCOAT 4600, ICI Acrylics, Cordova, Tenn.), 4.0 parts of titanium dioxide pigment, and 1.3 parts of slate blue pigment.

Comparative Example 8e

As a comparison, a pigmented capstock composition was prepared with 94.7 parts of an ASA resin (GELOY 1020, GE Plastics), 4.0 parts of titanium dioxide R960 pigment, and 1.3 parts of a slate blue pigment.

Comparative Example 8f

As a comparison, a pigmented capstock composition was prepared with 49.35 parts of an ASA resin (GELOY 1020, GE Plastics), 49.35 parts of the PVC resin formulation described in Example 8b, and 1.3 parts of a slate blue pigment.

TABLE 4

QUV Exposure Test Results of Pigmented (Blue) Capstocks

| | | Hours of QUV Exposure | | | | | | |
|---|---|---|---|---|---|---|---|---|
| | Capstock | 1000 | | 2000 | | 3000 | | 4500 |
| Ex. | Resin Base | ΔE | ΔL | ΔE | ΔL | ΔE | ΔL | ΔE | ΔL |
| 8a | Ex. 4c | 7.4 | 1.8 | 7.0 | 1.3 | 7.3 | 1.5 | 7.5 | 1.8 |
| 8b | Ex. 4c/PVC (50/50) | 7.2 | 1.8 | 7.1 | 1.3 | 7.6 | 1.4 | 8.6 | 1.5 |
| Reference 8c | PVC | 8.6 | 4.2 | 10.0 | 3.9 | 10.7 | 4.1 | 10.3 | 3.6 |
| Comparative 8d | Acrylic[a] | 7.6 | 2.2 | 7.3 | 1.9 | 7.6 | 2.0 | 7.6 | 2.0 |
| Comparative 8e | ASA[b] | 7.5 | 0.4 | 9.9 | 0.1 | 10.0 | 0.1 | 11.3 | 1.2 |
| Comparative 8f | ASA[b]/PVC (50/50) | 7.6 | 1.4 | 10.4 | 1.1 | 10.7 | 1.0 | 12.5 | 0.1 |

[a]TUFCOAT 4600 (ICI Acrylics)
[b]GELOY 1020 (GE Plastics)

The results in Table 4 show that the capstocks of Example 8a and 8c, have the lowest combination of ΔE and ΔL values over 4500 hours of QUV accelerated weathering testing. Therefore, capstock compositions prepared with the compositions in Example 4c provide better color-hold properties than capstock compositions prepared with commercially-available acrylic and ASA resins.

We claim:

1. A capstock composition for providing reduced gloss capstock materials, said composition comprising:
   (A) from 70 to 99 parts by weight of a first core/shell polymer comprising
      (i) from 30 to 70 parts by weight of a core polymer comprising
         (a) from 45 to 99.9 parts by weight of units derived from at least one C1–C8 alkyl acrylate monomer,
         (b) from 0 to 50 parts by weight of units derived from at least one ethylenically unsaturated copolymerizable monomer different from the at least one C1–C8 alkyl acrylate monomer, and
         (c) from 0.1 to 5 parts by weight of units derived from at least one crosslinker or graftlinker, and
      (ii) from 30 to 70 parts by weight of a shell polymer grafted to the core polymer (A)(i) comprising
         (a) from 80 to 99 parts by weight of units derived from at least one C1–C8 alkyl methacrylate monomer, and
         (b) from 1 to 20 parts by weight of units derived from at least one ethylenically unsaturated copolymerizable monomer different from the at least one C1–C8 alkyl metbacrylate monomer; and
   (B) from 1 to 30 parts by weight of a second core/shell polymer comprising
      (i) from 70 to 92 parts by weight of a core polymer comprising
         (a) from 50 to 99.9 parts by weight of units derived from at least one C1–C8 alkyl acrylate monomer,
         (b) from 0 to 45 parts by weight of units derived from at least one ethylenically unsaturated copolymerizable monomer different from the at least one C1–C8 alkyl acrylate monomer, and
         (c) from 0.1 to 5 parts by weight of units derived from at least one crosslinker or graftlinker; and
      (ii) from 8 to 30 parts by weight of a shell polymer comprising
         (a) from 50 to 100 parts by weight of units derived from at least one C1–C8 alkyl methacrylate monomer, and
         (b) from 0 to 50 parts by weight of units derived from at least one ethylenically unsaturated copolymerizable monomer different from the at least one C1–C8 alkyl methacrylate monomer,
   wherein the second core/shell polymer has a shell weight average molecular weight in the range of from 25,000 to 350,000 g/mol.

2. The capstock composition according to claim 1 further comprising from 0 to 5 parts by weight of at least one UV light stabilizer.

3. The capstock composition according to claim 1 further comprising from 0 to 100 parts by weight of at least one polyvinyl chloride resin.

4. The capstock composition according to claim 1 further comprising from 0 to 20 parts by weight of at least one pigment.

5. The capstock composition according to claim 1 further comprising from 0 to 15 parts by weight of at least one matting agent.

6. The capstock composition according to claim 1 further comprising from 0 to 5 parts by weight of a powder flow aid.

7. The composition of claim 1 wherein the shell weight average molecular weight of the second core/shell polymer is in the range of from 50,000 to 200,000 g/mol.

8. The composition of claim 1 wherein the shell weight average molecular weight of the second core/shell polymer is in the range of from 80,000 to 150,000 g/mol.

9. A process for preparing a reduced-gloss capstock comprising the steps of:
(I) preparing a mixture comprising
  (A) from 70 to 99 parts by weight of a first core/shell polymer comprising
    (i) from 30 to 70 parts by weight of a core polymer comprising
      (a) from 45 to 99.9 parts by weight of units derived from at least one C1–C8 alkyl acrylate monomer,
      (b) from 0 to 50 parts by weight of units derived from at least one ethylenically unsaturated copolymerizable monomer different from the at least one C1–C8 alkyl acrylate monomer, and
      (c) from 0.1 to 5 parts by weight of units derived from at least one crosslinker or graftlinker, and
    (ii) from 30 to 70 parts by weight of a shell polymer grafted to the core polymer (A)(i) comprising
      (a) from 80 to 99 parts by weight of units derived from at least one C1–C8 alkyl methacrylate monomer, and
      (b) from 1 to 20 parts by weight of units derived from at least one ethylenically unsaturated copolymerizable monomer different from the at least one C1–C8 alkyl methacrylate monomer; and
  (B) from 1 to 30 parts by weight of a second core/shell polymer comprising
    (i) from 70 to 92 parts by weight of a core polymer comprising
      (a) from 50 to 99.9 parts by weight of units derived from at least one C1–C8 alkyl acrylate monomer,
      (b) from 0 to 45 parts by weight of units derived from at least one ethylenically unsaturated copolymerizable monomer different from the at least one C1–C8 alkyl acrylate monomer, and
      (c) from 0.1 to 5 parts by weight of units derived from at least one crosslinker or graftlinker; and
    (ii) from 8 to 30 parts by weight of a shell polymer comprising
      (a) from 50 to 100 parts by weight of units derived from at least one C1–C8 alkyl methacrylate monomer, and
      (b) from 0 to 50 parts by weight of units derived from at least one ethylenically unsaturated copolymerizable monomer different from the at least one C1–C8 alkyl methacrylate monomer,
    wherein the second core/shell polymer has a shell weight average molecular weight in the range of from 25,000 to 350,000 g/mol;
(II) feeding the mixture into an extruder comprising a feed section and a metering section;
(III) metering and melting the mixture to form a melt, wherein the metering section has a temperature between 165° C. and 190° C., and the melt has a temperature between 165° C. and 195° C.;
(IV) forming the melt into a melt layer,
(V) extruding the melt layer; and
(VI) cooling the melt layer.

10. A capstock composition comprising:
(A) from 75 to 85 parts by weight of a first core/shell polymer comprising
  (i) from 35 to 66 parts by weight of a core polymer comprising
    (a) from 95 to 99.5 parts by weight of units derived from n-butyl acrylate,
    (b) from 0 to 4.5 parts by weight of units derived from at least one ethylenically unsaturated copolymerizable monomer different from n-butyl acrylate, and
    (c) from 0.5 to 2.5 parts by weight of units derived from allyl methacrylate, and
  (ii) from 55 to 65 parts by weight of a shell polymer grafted to the core polymer (A)(i) comprising
    (a) from 90 to 99 parts by weight of units derived from methyl methacrylate, and
    (b) from 1 to 10 parts by weight of units derived from at least one C1–C8 alkyl acrylate monomer; and
(B) from 15 to 25 parts by weight of a second core/shell polymer comprising
  (i) from 75 to 85 parts by weight of a core polymer comprising
    (a) from 90 to 99.0 parts by weight of units derived from n-butyl acrylate,
    (b) from 0.5 to 2.0 parts by weight of units derived from trimethylolpropane triacrylate, and
    (c) from 0.0001 to 0.001 parts by weight of units derived from allyl methacrylate; and
  (ii) from 15 to 25 parts by weight of a shell polymer comprising
    (a) from 95 to 100 parts by weight of units derived from at least one C1–C8 alkyl methacrylate monomer, and
    (b) from 0 to 5 parts by weight of units derived from at least one C1–C8 alkyl acrylate monomer,
  wherein the second core/shell polymer has a shell weight average molecular weight in the range of from 50,000 to 350,000 g/mol; and
(C) from 0.5 to 3.0 parts by weight of at least one UV light stabilizer.

11. The process according to claim 9 wherein the metering temperature is between 170° C. and 185° C. and the melt temperature is between 170° C. and 190° C.

12. A synthetic resin composite, comprising a substrate layer comprising an extrudable thermoplastic resin, and a reduced-gloss capstock layer disposed thereon comprising a capstock composition comprising:
(A) from 70 to 99 parts by weight of a first core/shell polymer comprising
  (i) from 30 to 70 parts by weight of a core polymer comprising
    (a) from 45 to 99.9 parts by weight of units derived from at least one C1–C8 alkyl acrylate monomer,
    (b) from 0 to 50 parts by weight of units derived from at least one ethylenically unsaturated copolymerizable monomer different from the at least one C1–C8 alkyl acrylate monomer, and
    (c) from 0.1 to 5 parts by weight of units derived from at least one crosslinker or graftlinker, and
  (ii) from 30 to 70 parts by weight of a shell polymer grafted to the core polymer (A)(i) comprising
    (a) from 80 to 99 parts by weight of units derived from at least one C1–C8 alkyl methacrylate monomer, and
    (b) from 1 to 20 parts by weight of units derived from at least one ethylenically unsaturated copolymerizable monomer different from the at least one C1–C8 alkyl methacrylate monomer; and (B) from 1 to 30 parts by weight of a second core/shell polymer comprising
  (i) from 70 to 92 parts by weight of a core polymer comprising
    (a) from 50 to 99.9 parts by weight of units derived from at least one C1–C8 alkyl acrylate monomer,
    (b) from 0 to 45 parts by weight of units derived from at least one ethylenically unsaturated copolymerizable monomer different from the at least one C1–C8 alkyl acrylate monomer, and
    (c) from 0.1 to 5 parts by weight of units derived from at least one crosslinker or graftlinker; and
  (ii) from 8 to 30 parts by weight of a shell polymer comprising
    (a) from 50 to 100 parts by weight of units derived from at least one C1–C8 alkyl methacrylate monomer, and
    (b) from 0 to 50 parts by weight of units derived from at least one ethylenically unsaturated copolymerizable monomer different from the at least one C1–C8 alkyl methacrylate monomer, wherein the second core/shell polymer has a shell weight average molecular weight in the range of from 25,000 to 350,000 g/mol.

13. The synthetic resin composite of claim 12 wherein the capstock layer has an average gloss measured at a 75 degree incident angle geometry of less than 60.

14. The synthetic resin composite of claim 12 wherein the capstock layer has a drop dart impact strength of greater than 25 in-lbs at 23° C. according to ASTM D4226.

15. The synthetic resin composite of claim 12 wherein the capstock layer has a $\Delta E$ value of 8.0 or less and a $\Delta L$ value of 2.0 or less after 1000 hours of accelerated weathering according to ASTM D4329 Cycle C.

* * * * *